C. C. SCHULTZ.
HOSE COUPLING.
APPLICATION FILED DEC. 16, 1911.
1,036,349.
Patented Aug. 20, 1912.
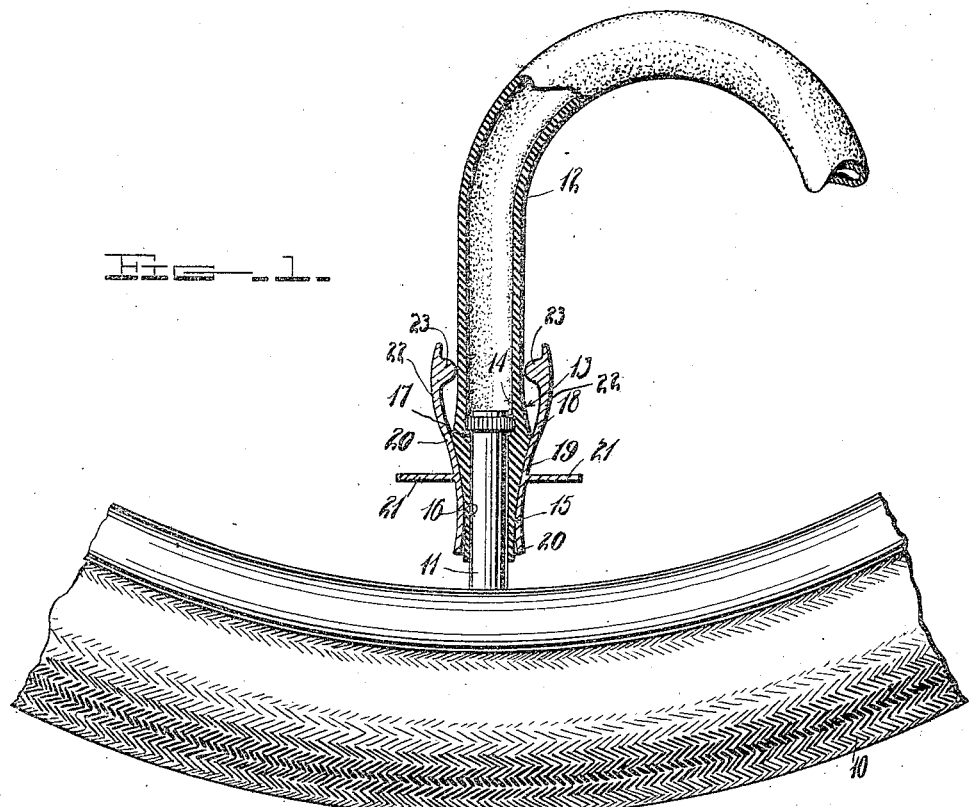
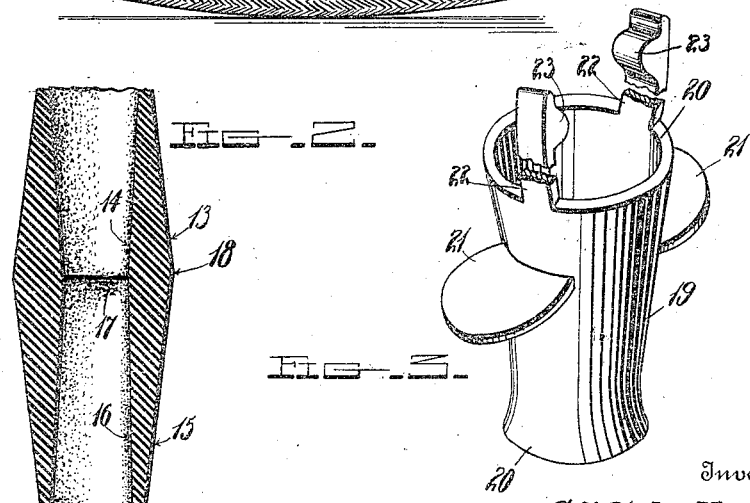
Witnesses
W. C. Fielding.
Francis Boyle.
Inventor
C. C. Schultz,
By Chandler & Chandler
Attorneys

UNITED STATES PATENT OFFICE.

CARL C. SCHULTZ, OF VICTOR, IOWA.

HOSE-COUPLING.

1,036,349. Specification of Letters Patent. Patented Aug. 20, 1912.

Application filed December 16, 1911. Serial No. 666,176.

*To all whom it may concern:*

Be it known that I, CARL C. SCHULTZ, a citizen of the United States, residing at Victor, in the county of Iowa, State of Iowa, have invented certain new and useful Improvements in Hose-Couplings; and I do hereby declare the following to be a full, clear, and exact description of the invention, such as will enable others skilled in the art to which it appertains to make and use the same.

This invention relates to hose couplings, more particularly to couplings used in connection with tire inflating pumps to attach the pump hose to the tire valve.

An object of the present invention is to provide a novel coupling which may be easily and quickly applied, will clamp the valve securely whereby leakage is prevented, and finally will not be displaced from operative position during the inflating operation.

With the above objects in view the invention consists of certain novel details of construction and combination of parts hereinafter fully described and claimed, it being understood that various modifications may be made in the minor details of construction within the scope of the appended claims.

In the accompanying drawing forming part of this specification:—Figure 1 is a fragmentary view in elevation of a tire showing my improved coupling applied to the valve thereof, the coupling being shown in section. Fig. 2 is a fragmentary longitudinal sectional view of the flexible nozzle detached. Fig. 3 is a perspective view of the coupling sleeve.

Referring now to the drawing in which like characters of reference designate similar parts, 10 designates a pneumatic tire having an inflating valve 11 of ordinary construction.

The valve engaging device comprising the subject-matter of this invention consists of a hose 12 the wall of which is thickened near the tip with a resultant flare 13 to the outer face and constriction 14 in the bore, the wall being from thence tapered in thickness with a resultant flare 15 to the bore and constriction 16 to the outer face, this construction forming a circumferential rib 17 in the bore and a circumferential rib 18 on the outer face in alinement with the rib in the bore. The nozzle thus formed is adapted to be slipped down on the valve casing of the tire until the circumferential rib of the bore engages underneath the boss of the casing.

For locking the nozzle in the position just described, I provide a sleeve 19 which is flared outwardly at both ends as shown at 20 and is furthermore provided on the opposite sides with projecting fingers 21 which form finger rests for manipulating the sleeve. This sleeve is slidably fitted on the nozzle below the external circumferential rib, and is of such diameter as to compress the nozzle at said rib as shown in Fig. 1. The sleeve tightly clamps the tip of the nozzle to the valve casing below the boss thereof and positively prevents retrograde movement of the tip over the boss during the inflating operation.

By virtue of the novel construction of coupling above described it will be apparent without further explanation that the coupling may quickly be applied or removed by a simple manipulation of the sleeve through the instrumentality of the fingers thereon, and that the coupling will so tightly bind upon the valve casing as to prevent leakage and also prevent displacement of the coupling during the inflating operation.

For holding the sleeve against escape from the nozzle I provide a pair of upstanding spring arms 22 having rounded jaws 23 on their inner faces near their tips for engagement with opposite sides of the nozzle above the circumferential rib 18, the latter obstructing the passage of the jaws thereover and forming a stop which positively prevents escape of the sleeve.

What is claimed, is:—

1. A hose coupling including a flexible nozzle having a projection in the bore and having a projection on the outer wall near the projection in the bore, and a sleeve encircling the nozzle on one side of the outer projection and adapted to compress the nozzle at said outer projection, and spring arms projecting from one edge of the sleeve having rounded jaws engaging said nozzle rearwardly of said outer projection and serving to prevent escape of said sleeve from said nozzle.

2. A hose coupling including a flexible nozzle having the wall thickened near the tip with a resultant flare to the outer face and constriction in the bore, the wall being from thence tapered in thickness with a resultant flare to the bore and constriction to the outer face, whereby inner and outer alined circumferential ribs are formed on the wall, and a sleeve having flared ends and having oppositely disposed projecting fingers, said sleeve being of such diameter as to compress the nozzle at both ribs.

In testimony whereof, I affix my signature, in presence of two witnesses.

CARL C. SCHULTZ.

Witnesses:
S. K. ROSENBERGER,
J. C. SIMS.